United States Patent [19]

Reyes

[11] 4,141,233
[45] Feb. 27, 1979

[54] KINGPIN LOCK FOR SEMI-TRAILER TYPE TRAVEL TRAILERS

[76] Inventor: Eugene E. Reyes, 6004 Mulberry Ave., Lake Isabella, Calif. 93240

[21] Appl. No.: 865,997

[22] Filed: Dec. 30, 1977

[51] Int. Cl.² ............................................. F16B 41/00
[52] U.S. Cl. ........................................................ 70/232
[58] Field of Search ................... 70/14, 229, 230, 231, 70/232; 280/432, 507

[56] References Cited

U.S. PATENT DOCUMENTS

| | | | |
|---|---|---|---|
| 1,426,119 | 8/1922 | Southard | 70/232 |
| 2,565,659 | 8/1951 | Kontra | 70/232 |
| 2,656,706 | 10/1953 | Lucas | 70/232 |
| 2,785,564 | 3/1957 | Rossi | 70/232 |
| 3,112,636 | 12/1963 | McIntyre | 70/232 |
| 3,982,413 | 9/1976 | Stone | 70/229 |
| 4,039,202 | 8/1977 | Barnettler | 70/232 |

FOREIGN PATENT DOCUMENTS 2503915  8/1976  Fed. Rep. of Germany ............. 70/232

Primary Examiner—Robert L. Wolfe
Attorney, Agent, or Firm—Max E. Shirk

[57] ABSTRACT

A lock encircles the annular locking groove on the kingpin of a travel trailer of the semi-trailer type to prevent the kingpin from entering the receiving slot of the fifth wheel on a towing vehicle and includes locking collar halves each having a semi-annular body portion from the ends of which flanges extend radially outwardly. One flange on one half is S-shaped and has a hooked end engagable in a slot on a flange on the other half for releasably coupling the halves together with the remaining two flanges in abutting relation. These remaining two flanges may be provided with apertures adapted to receive a padlock hasp for locking the two halves together.

1 Claim, 3 Drawing Figures

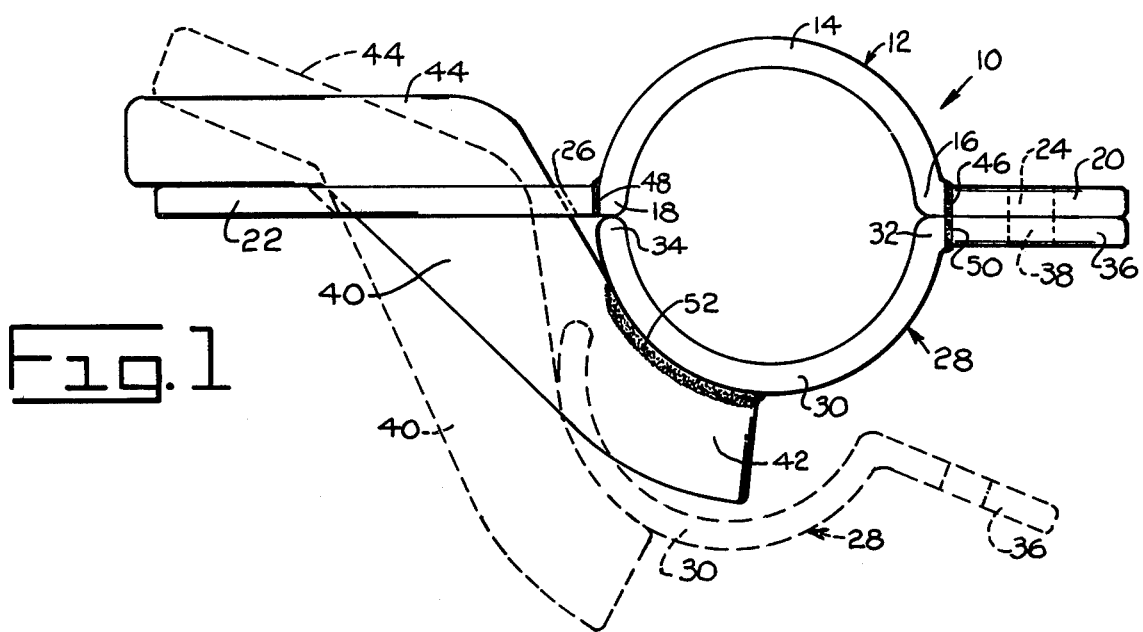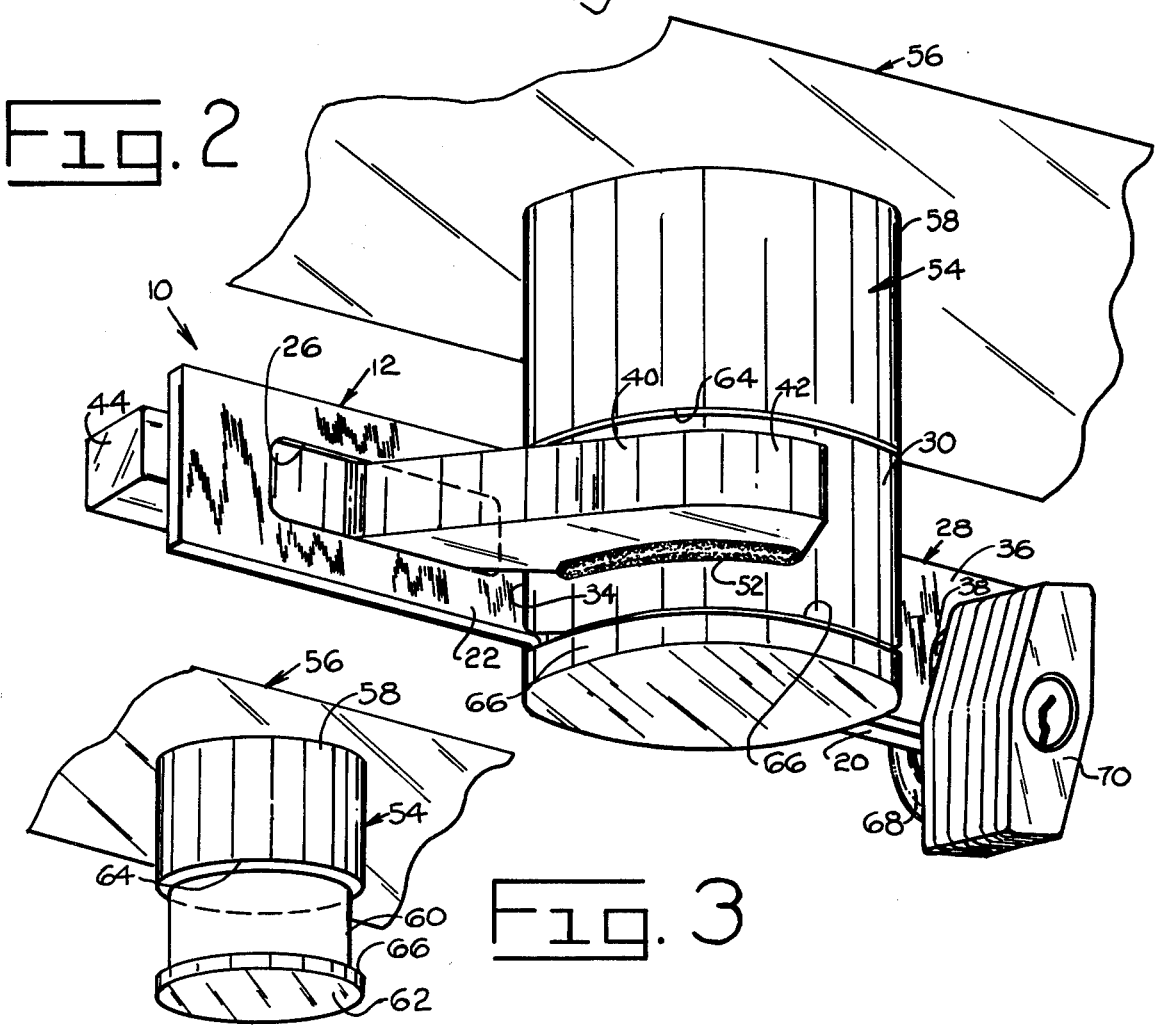

KINGPIN LOCK FOR SEMI-TRAILER TYPE TRAVEL TRAILERS

BACKGROUND OF THE INVENTION

The background of the invention will be set forth in two parts.

1. Field of the Invention

The present invention pertains generally to the field of locking devices and more particularly to a new and useful kingpin lock for semi-trailer type travel trailers.

2. Description of the Prior Art

U.S. Pat. Nos. 2,656,706 and 3,982,413 were discovered on a prior art search and constitute the only prior art presently known to applicant.

U.S. Pat. No. 2,656,706 discloses a split-collar lock for a fifth wheel kingpin, the kingpin having an annular groove, the collar including two substantially semi-annular hinged sections, the sections being the same thickness as the annular groove and the inner diameter being substantially equal to the diameter of the annular groove whereby the sections close around the kingpin within the annular groove. One of the sections has a slot in which a latch is pivotally secured. The opposing section has a similar slot, the latch engaging a catch portion bridging the last-named slot when the sections are in locking position. The latch has a notch adapted to engage the catch portion to securely link the two sections in locking position. A key-operated bolt is adapted to engage the latch to secure the latch in locking position with the catch.

U.S. Pat. No. 3,982,413 discloses a lock collar comprising a pair of generally semi-circular similar locking segments each having a pair of mating, overlaping end portions of reduced thickness. The mating portions of one end of the locking segments are connected together by a pivot pin. The mating portion of the other end of the segments are provided with lock-receiving passages through which a lock element passes. The passage of one segment has a latch-receiving keyway and the lock element includes a spring latch element permitting the same to be snapped into locking position within the keyway when the segments are in closed position.

While generally satisfactory, lock collars of the types disclosed in these two patents, have the disadvantages that they are difficult to install on a kingpin covered with grease and dirt and the key-operated locking elements may become fouled by this grease and dirt.

SUMMARY OF THE INVENTION

In view of the foregoing factors and conditions characteristic of prior art lock collars, it is a primary object of the present invention to provide a new and useful lock collar not subject to the disadvantages enumerated above.

According to the present invention, a lock is provided for encircling the annular groove on a semi-trailer kingpin to prevent the kingpin from entering the receiving slot of a fifth wheel.

The lock comprises a first locking collar half including a first semi-annular body portion having first and second ends with first and second flanges extending radially outwardly from the first and second ends of the first body portion. An aperture is provided in the first flange and an elongated slot is provided in the second flange.

The lock also comprises a second locking collar half including a second semi-annular body portion having first and second ends, a third flange extending radially outwardly from the first end of the second body portion, an aperture provided in the third flange and an S-shaped flange having a first end affixed to the second body portion adjacent its second end and a second end adapted to pass through the elongated slot in the second flange and abut the second flange when the body portions encompass the annular groove with the first and third flanges in abutting relationship so that the apertures will be aligned for receiving a padlock hasp.

The features of the present invention which are believed to be novel are set forth with particularity in the appended claims. The present invention, both as to its organization and manner of use, together with further objects and advantages thereof, may best be understood by making reference to the following description, taken in connection with the accompanying drawings in which like reference characters refer to like elements in the several views.

BRIEF DESCRIPTION OF THE DRAWINGS

FIG. 1 is a plan view of a kingpinlock constituting a presently-preferred embodiment of the invention showing the lock in a closed position in solid lines and in an open position in broken lines;

FIG. 2 is an enlarged, perspective view of the lock of FIG. 1 in combination with a semi-trailer kingpin; and FIG. 3 is a reduced, perspective view of the kingpin of FIG. 2.

DESCRIPTION OF THE PREFERRED EMBODIMENT

Referring again to the drawing, a kingpin lock constituting a presently-preferred embodiment of the invention, generally designated 10, comprises a first locking collar half 12 including a first semi-annular body portion 14 having first and second ends 16, 18 from which first and second flanges 20, 22, respectively, extend radially outwardly. An aperture 24 may be provided in the first flange 20 and an elongated slot 26 may be provided in the second flange 22.

Kingpin lock 10 also comprises a second locking collar half 28 including a second semi-annular body portion 30 having first and second ends 32, 34. A third flange 36 extends radially outwardly from the first end 32 and is provided with an aperture 38. The locking collar half 28 also includes an S-shaped flange 40 having a first end 42 affixed to the second body portion 28 adjacent its second end 34 and a second end 44 adapted to pass through the elongated slot 26 in the second flange 22 and abut the second flange 22, as shown in FIG. 1, when the body portions 14, 30 are assembled with the first flange 20 and the third flange 36 abutting each other.

Body portions 14, 30 may be prepared by cutting a short length of steel pipe in two longitudinally. Flange 20 may then be secured to end 16 of body portion 14 by a suitable weldment 46 and flange 22 may be secured to end 18 of body portion 14 by a weldment 46 and flange 22 may be secured to end 18 of body portion 18 by a weldment 48. Likewise, flange 36 may be secured to end 32 of body portion 30 by a weldment 50 and end 42 of flange 40 may be secured to body portion 30 by a weldment 52. It will be apparent to those skilled in the art, on the other hand, that locking collar half 12 and body portion 30 with its flange 36 may be stamped from a suitable piece of strap iron.

Referring now more particularly to FIGS. 2 and 3, a kingpin 54 depends from the floor 56 of a travel trailer of the fifth wheel type (not shown). Kingpin 54 includes an upper end 58, which is secured to floor 56, an intermediate portion 60 and a lower end 62. The intermediate portion 60 has a smaller diameter than either the upper end 58 or the lower end 62 so that an annular coller is formed between an upper shoulder 64 and a lower shoulder 66. The width, thickness and radius-of-curvature of body portions 14, 30 is such that body portions 14, 30 will fill annular groove 60 between shoulders 64, 66 without protruding beyond the major diameter of kingpin 54, as best shown in FIG. 2. The hasp 68 of a padlock 70 may then be passed through apertures 24, 38 to securely lock locking collar halves 12, 28 together. It will be apparent to those skilled in the art that radially-extending flanges 20, 22, 36 and 40 prevent kingpin 54 from entering the slot of a fifth wheel on a towing vehicle (not shown).

It is believed that the manner of using kingpin lock 10 is apparent and will be briefly summarized at this point.

End 44 of flange 40 may be passed through slot 26 in flange 22 and locking collar half 28 may be held in the open position shown in broken lines in FIG. 1 while body portions 14, 30 are positioned in annular groove 60. Flanges 20, 36 may then be swung to the abutting position shown in solid lines in FIG. 1 and padlock hasp 68 may be passed through apertures 24, 38 to lock collar halves 12, 28 together, as shown in FIG. 2. When thus locked, end 44 of flange 40 will abut flange 22 to thereby minimize the likelihood that a pry-bar may be inserted between end 44 and flange 22.

While the particular kingpin lock herein shown and described in detail is fully capable of attaining the objects and providing the advantages hereinbefore stated, it is to be understood that it is merely illustrative of the presently-preferred embodiment of the invention and that no limitations are intended to the details of construction herein shown and described except as defined by the appended claims, which form a part of this disclosure.

What is claimed is:

1. A lock for a semi-trailer kingpin having upper and lower ends constituting a major diameter of said kingpin and a reduced-diameter intermediate portion, whereby an upper shoulder, an annular groove and a lower shoulder are formed on said kingpin, said lock comprising:

a first locking collar half including a first semi-annular body portion having first and second ends, first and second flanges extending radially outwardly from said first and said second ends of said first semi-annular body portion, respectively, an aperture provided in said first flange and an elongated slot provided in said second flange;

a second locking collar half including a second semi-annular body portion having first and second ends, a third flange extending radially outwardly from said first end of said second body portion, an aperture provided in said third flange and a S-shaped flange having a first end affixed to said second body portion adjacent its second end and a second end adapted to pass through said elongated slot in said second flange and abut said second flange when said first and second semi-annular body portions encompass said annular groove with said first and third flanges in abutting relationship to thereby minimize the likelihood that a pry-bar may be inserted between said second end of said S-shaped flange and said second flange, the width, thickness and radius-of-curvature of each of said body portions being such that said body portions will fill said annular groove between said upper shoulder and said lower shoulder without protruding beyond said major diameter of said kingpin; and a padlock hasp passing through said apertures in said first and third flanges for maintaining said body portions in said locked, encompassing relationship in said kingpin groove.

* * * * *